United States Patent Office 3,592,620
Patented July 13, 1971

3,592,620
METHOD OF HEAT SEALING THE OUTER LAYERS OF A GLASS LAMINATE
Anthony R. Carlisi, Elmira, Joseph J. Domicone, Horseheads, and Leon P. Pelletier, Schenectady, N.Y., assignors to Corning Glass Works, Corning, N.Y.
No Drawing. Filed Aug. 21, 1968, Ser. No. 754,479
Int. Cl. C03b 23/20
U.S. Cl. 65—30                                        4 Claims

ABSTRACT OF THE DISCLOSURE

This invention relates to a method, and the product resulting therefrom, for closing the gap at the edge of a laminated structure, by flame heating the gap and introducing into the flame at least one compound thermally decomposable to at least one glass network forming oxide selected from the group consisting of $SiO_2$ and $B_2O_3$, so as to in combination lower the surface tension of the adhered glass layer and deposit a layer of glass having properties similar to that of the adhered layer; thereby sealing the edge gap and completely enveloping the core portion of the laminate.

BACKGROUND OF THE INVENTION

In the past, glass has been thought of as a weak and brittle material. Although glass is a brittle material, it cannot truly be classified as a weak one. Glass normally fails in tension as the result of surface defects. Therefore, many attempts have been made to strengthen glass by providing it with a surface layer which is in compression.

One technique by which to provide glass with a compressively stressed surface layer is to prepare a laminated structure having a core portion and an adhered layer fused thereto. The core portion will normally have a coefficient of thermal expansion greater than that of the adhered layer. Thus, cooling from the elevated forming temperature will result in the core portion contracting a greater amount than the adhered layer. This difference in contraction creates a tensile stress in the core and a compressive stress in the adhered layer. Thus, the surface of the article is provided with a compressively stressed layer and the strength of the entire article is thereby increased beyond that of the unstressed glass. A recent invention as described in U.S. patent application, Ser. No. 735,074, filed June 6, 1968, entitled "Laminated Bodies" describes a method and the specific parameters necessary for the manufacture of such laminated bodies. In the preferred embodiment of that application a core ply is laminated with two adhered plies so as to form the laminated body. In general, the laminate is prepared in the form of a sheet from which the appropriate shape is then cut and formed. Along the cut edge, the core portion is exposed. The amount of exposure of the core portion through this edge gap has been minimized through the appropriate design of the cutting heads. However, a small portion of the core is almost invariably exposed between the two adhered plies. Therefore, in order for the body to attain its maximum strength, it is desirable that the adhered plies completely envelop the core portion. Since this envelopment cannot generally be obtained through the use of mechanical cutters, other techniques had to be devised to complete the envelopment of the core portion.

Hence, although almost all of the surface of the laminate is compressively stressed that portion at the edge gap is not so stressed. Therefore, failure can begin at the edge gap. Thus, in order to provide a completely desirable product, it was necessary to provide a method for closing the edge gap so as to provide a compressive stress thereat and thereby produce a body whose entire surface was compressively stressed.

The first approach to solving this problem, in addition to the cutter head design, was to fire polish the edge along which the article had been cut out. It was found that during the fire polishing, the edge rounded out as would be expected. However, the adhered plies of the laminate would not join together. Furthermore, during fire polishing, it was observed that at times the gap between the adhered plies seemed to become larger. From this it was concluded that the surface tension of the adhered layer was so great as to pull the adhered layer back and increase the size of the gap. Hence, it was believed that if the surface tension of the adhered layer could be lowered, the adhered layer might then flow together and close the gap. Furthermore, if the compounds which could lower the surface tension could also be deposited across the gap and have properties similar to that of the adhered layer, a maximum strengthening of a laminate would be attained.

SUMMARY OF THE INVENTION

We have found that by introducing certain thermally decomposable compounds into the fire polishing flame, we can lower the surface tension of the adhered plies so as to cause the adhered plies to flow together across the edge gap and by proper selection of the composition of these thermally decomposable compounds we can also deposit an elementary glass across the edge gap. This elementary glass should have a coefficient of thermal expansion similar to that of the adhered ply and the chemical durability of the deposited glass should be similar to that of the adhered ply. The desired results of lowering the surface tension of the adhered layer and the depositing of an elementary glass across the edge gap can be accomplished by the addition of compounds to the flame which are thermally decomposable to at least one glass network forming oxide selected from the group consisting of $SiO_2$ and $B_2O_3$. The composition of the deposited glass can be adjusted so that the properties of the deposited glass will approximate those of the adhered layer.

DESCRIPTION OF THE PREFERRED EMBODIMENT

Our invention may be used on a glass laminate of any shape having an exposed core portion which has not been completely enveloped by the adhered layer. However, in practice our invention is most frequently used with shapes, formed from a laminated sheet, having a tensilely stressed core ply and compressively stressed plies adhered thereto. In most instances a shape has been cut from the laminated sheet so that along the cut edge a small portion of the tensilely stressed core is exposed. Thus, in the preferred embodiment we will be dealing with shapes taken from a sheet.

As indicated before when these bodies were fire polished in accordance with normal commercial practice, the adhered plies might draw back and leave a larger gap opening. This opening could be anywhere from about 0.001 to 0.008 inch.

In view of the fact that the gap might frequently grow larger during fire polishing, it was believed that the surface tension of the adhered glass was greater than that of the core gas. Therefore, in order to close the gap it was thought that one approach might be to lower this surface tension of the adhered glass so as to cause the adhered glass plies to flow together and thus close the gap. One method for lowering the surface tension of the adhered layer was to make additions to the flame so as to deposit various surface tension reducing oxides on the surface of the glass while it is being fire polished. These additions normally consisted of at least one network forming oxide selected from the group consisting of $SiO_2$ and $B_2O_3$. We have found that these materials are best added by saturating the fuel gas, which is normally natural gas, with the vapor of a compound which will thermally decompose to the desired oxides. Although we prefer to saturate the fuel gas with the desired compound or compounds it is also possible to saturate the oxygen gas, which is mixed in the fire polishing flame, therewith. This is normally best done by utilizing liquids through which the fuel gas can be bubbled and the vapors of which will saturate the fuel gas, so that in the flame the desired oxide will be formed and propelled to the surface of the glass. The deposition of the additive on the glass may then reduce the surface tension of the adhered layers so that they will flow together and close the gap. In order to saturate the gas, the selected compounds must be volatile and in order for the compounds to form the desired oxide so as to reduce the surface tension of the adhered layer the compounds must be thermally decomposable. Therefore, the compounds can be characterized as being a volatile liquid which will thermally decompose to $SiO_2$ or $B_2O_3$. Those $SiO_2$ containing compounds which meet the aforementioned requirements can be selected from the group consisting of silanes, chlorosilanes, silicones, silicohalides, organic silicates, and ortho- and disilicic acid. The applicable boron compounds can be selected from ortho-, meta-, and tetraboric acid, boranes, and boron halides. In general, the halide compounds would not be preferred since they produce toxic fumes and the combustion product of hydrochloric or hydrofluoric fumes may attack the glass surface. Either $SiO_2$ or $B_2O_3$ containing compounds will sufficiently reduce the surface tension so as to allow the adhered plies to flow together. However, it is possible that during the flame polishing operation that some glass may be deposited over the surface. This deposited glass should match the properties of the adhered layers as closely as possible. Therefore, if the deposited glass contains too much $SiO_2$ the expansion may be too low and on the other hand if the glass contains too much $B_2O_3$, its durability may be too low. Thus, for each adhered layer it will be necessary to determine that range of compositions of $SiO_2$ and $B_2O_3$ which will approximate the properties of the adhered ply.

In addition to the ratio of compositions it is important that the solution through which the fuel gas or oxygen is bubbled is maintained at a constant composition. In some instances, if the temperature of the solution is allowed to get too high or too low, the composition of the solution will change and thus the ratio of the deposited oxides will change. This could result in the surface tension of the adhered plies not being sufficiently reduced or the composition of the deposited glass having properties outside that of the desired ranges.

Another factor which seemed to be important was whether the flame was oxidizing or reducing, as measured in terms of the ratio of the oxygen to fuel gas. However, we have found that, unless the flame is exceedingly oxidizing, an oxidizing flame can be used as well as a reducing flame. Thus, we prefer to use an oxidizing flame since it is easier to control than a reducing flame. Moreover, we have found that when the flame is oxidizing we tend to promote a greater decrease in surface tension than when the flame is reducing. This greater decrease in surface tension yields a thicker adhered layer at the edge gap.

In addition to the process and material variables, the further variables of the equipment are introduced. The efficiency of the burners, the temperature of the glass before fire polishing, the time which is necessary to heat the glass to a uniform temperature, distance of the burners from the object, and many other similar equipment variables, can to a limited extent, affect the reduction of surface tension and deposition of a glass across the gap.

We have been very successful in strengthening the objects which we subjected to treatment. In general, we might say that there has been at least a 100% improvement in the rim impact strength of objects strengthened by this technique. Moreover, the addition of the addtives to the flame has been shown to help suppress reboil. That is, the formation of bubbles in the glass at the reheated surface.

More specifically, this invention has been used, with great success, with a particular glass laminate. In this laminate the tensilely stressed core portion is a glass consisting essentially, in weight percent on the oxide basis as calculated from the batch, of 59.1% $SiO_2$, 17.1% $Al_2O_3$, 11.1% $Na_2O$, .6% CaO, .4% MgO, 7.5% ZnO, 3.8% F, and .4% $B_2O_3$. The compressively stressed adhered plies are a glass consisting essentially, in weight percent on the oxide basis as calculated from the batch, of 57% $SiO_2$, 15% $Al_2O_3$, 12% CaO, 8% MgO, and 8% $B_2O_3$. The adhered plies have a coefficient of thermal expansion of $46 \times 10^{-7}/°$ C. while that of the core portion is $70 \times 10^{-7}/°$ C. Although in the preferred embodiment we have used a specific combination of glasses, many other combinations may be used. For example, any of the glasses as taught in the aforementioned application "Laminated Bodies" may be used. In accordance with changes made in the laminate, corresponding changes must be made in the flame additives.

With the specific glass laminate as described above, the use of solutions of ethylorthosilicate and methylborate as flame additives has yielded excellent results. In general, a solution of ethylorthosilicate and methylborate is prepared and the fuel gas bubbled therethrough. Ethylorthosilicate may be purchased as it is commercially available. However, it is best to prepare te methylborate shortly before use. The methylborate is prepared by adding a sufficient amount of reagent grade boric acid ($H_3BO_3$) to saturate a given volume of absolute methanol (99.8% purity $CH_3OH$). At 25° C. it takes approximately 200 grams of boric acid per liter of absolute methanol to form the saturated solution. Normally, a slight excess of boric acid is added to be certain that the solution is saturated and remains so during usage. The methylborate and ethylorthosilicate are then mixed in the desired ratio and maintained in a closed vessel at approximately room temperature. Next a fuel gas line is placed in the flask so that the end of the line extends below the surface of the additive solution. An exhaust line is also placed in the flask but above the surface of the solution. The fuel gas is then bubbled through the additive solution in which case it becomes saturated with ethylorthosilicate and methylborate vapors. The saturated fuel gas then passes through the exhaust line to the burner head. It is advantageous to maintain an oxidizing flame when using mixtures of ethylorthosilicate methylborate so as to assure the maximum gap coverage. With our apparatus an oxygen to fuel gas volume ratio of about 1.6:1 provides a satisfactory oxidizing flame. However, with other equipment having different burner heads, etc. ratios as high as about 3:1 may be used.

The following examples will better illustrate our invention.

EXAMPLE I

An additive solution was prepared consisting of equal volumes of ethylorthosilicate and methylborate as described above. The additive solution was then placed in a 500 ml. flask which was then heated at a low temperature, about 120° C., so as to maintain the temperature of the solution at about room temperature. An inlet fuel gas line was then placed in the flask such that the end thereof was below the surface of the solution. An exhaust line, for the additive vapor saturated fuel gas, was also placed in the flask. However, the end of the exhaust line was above the surface of the solution. The flask was then sealed. The exhaust line was connected to a fire polishing burner head as was an oxygen gas line. A laminated custard cup having a rim diameter of 4½ inches, a bottom diameter of 3 inches, a height of 1⅜ inches and a wall thickness of .131 inch was placed in a fire polisher having five (5) burner heads aimed at the cup's rim. The core ply was about .125 inch thick and each adhered ply was about .003 inch thick. The cup was made of the glasses described above and there was a gap between the adhered plies of between .006 and .008 inch. The rim of the cup was positioned about ½ inch from the burner heads. Oxygen was then fed through the oxygen line at the rate of 35 cubic feet per hour and natural gas was fed through the inlet fuel line at the rate of 22 cubic feet per hour, or on oxygen to gas ratio of about 1.6:1. The cup was rotated so as to assure complete fire polishing of the whole rim and was fire polished for about 25 seconds. Upon examination it was found that the gap had closed and the adhered plies completely enveloped the core portion. The glass which covered the gap was about .005 inch thick indicating a good reduction of the surface tension so as to allow the adhered plies to flow together. A small amount of a glass consisting essentially of, in weight percent on the oxide basis as calculated from the solutions, about 70% $SiO_2$ and 30% $B_2O_3$ may have been deposited across the gap; the coefficient of thermal expansion of the deposited glass was close to that of the adhered plies. The treated cup was then tested and found to have a rim impact strength of about .64 ft. lbs. which is greater than the .38 ft. lbs. strength of the untreated ware.

In the system as described in Example I we have found that if the deposited glass is too high in $SiO_2$ it has too low an expansion, and is difficult to deposit because it can be quite refractory. On the other hand, if the glass is too high in $B_2O_3$, the expansion is too high and the chemical durability is poor. Thus, for that laminate it is preferable to maintain the $B_2O_3$ between about 15 and 45 weight percent and the $SiO_2$ between about 85 and 55 weight percent as calculated from the solution. In order to achieve these compositions, the volume ratio of methylborate to ethylorthosilicate should be maintained between 2:1–1:2.

The laminate having the sealed edge gap can then be heat treated or handled in the same manner as the unsealed laminate without any undesirable effects.

We claim:
1. A method of treating a laminated glass article comprised of two outer skin layers and an inner core portion, wherein at least part of said inner core portion is exposed, so as to cause said outer skin layers to spontaneously flow together over said exposed inner core portion, comprising the steps of introducing into the fuel mixture for a fire polishing flame at least one volatile compound which is thermally decomposable to at least one glass-surface-tension-reducing oxide selected from the group consisting of $SiO_2$ and $B_2O_3$, igniting said fuel mixture, and applying the fire polishing flame produced thereby to the area of said exposed inner core portion, to cause a decrease in the surface tension of said outer skin layers, for a time sufficient to cause said outer skin layers to flow together over said exposed inner core portion.

2. The method of claim 1 wherein said fuel mixture for the oxidizing fire polishing flame consists essentially of a mixture of oxygen and natural gas having a volume ratio of oxygen to natural gas ranging from about 1.6:1 to about 3:1.

3. The method of claim 2 wherein said volatile compounds are introduced into said fuel mixture by saturating said fuel mixture with the vapors of said volatile compounds.

4. The method of claim 3 wherein said volatile compounds consist of at least one compound selected from the group consisting of methyl borate and ethyl orthosilicate.

References Cited

UNITED STATES PATENTS 3,099,549    7/1963    Domicone et al. _____ 65—30

ARTHUR D. KELLOGG, Primary Examiner

U.S. Cl. X.R.

65—38, 58, 104